(12) United States Patent
Kimura et al.

(10) Patent No.: US 11,063,507 B2
(45) Date of Patent: Jul. 13, 2021

(54) ELECTRONIC APPARATUS CAPABLE OF SUPPRESSING NEGATIVE EFFECTS OF A SWITCHING OPERATION OF A POWER SOURCE AND CONTROL METHOD

(71) Applicant: CANON KABUSHIKI KAISHA, Tokyo (JP)

(72) Inventors: Masao Kimura, Kariya (JP); Izumi Kaburagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/931,112

(22) Filed: May 13, 2020

(65) Prior Publication Data

US 2020/0274436 A1    Aug. 27, 2020

Related U.S. Application Data

(63) Continuation of application No. PCT/JP2018/041972, filed on Nov. 13, 2018.

(30) Foreign Application Priority Data

Nov. 16, 2017 (JP) ............................. JP2017-220839

(51) Int. Cl.
*H02M 1/14* (2006.01)
*H04N 5/232* (2006.01)
(Continued)

(52) U.S. Cl.
CPC ........... *H02M 1/143* (2013.01); *H02M 3/157* (2013.01); *H04N 5/232411* (2018.08); *H02M 2001/0032* (2013.01)

(58) Field of Classification Search
CPC .......... H02M 1/14; H02M 1/143; H02M 1/15; H02M 3/156–158; H02M 2001/0032
(Continued)

(56) References Cited

U.S. PATENT DOCUMENTS 9,079,100 B2 *  7/2015  Watabe .................... A63F 13/00
9,287,776 B2 *  3/2016  Mei ........................ H02M 3/156
(Continued)

FOREIGN PATENT DOCUMENTS

JP    2008-092712 A    4/2008
JP    2008-219292 A    9/2008
(Continued)

OTHER PUBLICATIONS

The above foreign references 2-4 were cited the International Search Report of PCT/JP2018/041972 dated Jan. 22, 2019.

*Primary Examiner* — Yemane Mehari
(74) *Attorney, Agent, or Firm* — Cowan, Liebowitz & Latman, P.C.

(57) ABSTRACT

An electronic apparatus includes a power source unit and a control unit. The power source unit includes a first inductor, a second inductor different from the first inductor, and a switching unit that performs switching so that one of the first and the second inductor is used. The power source unit is capable of operating in a first operation mode or a second operation mode different from the first operation mode. The control unit determines which one of the first and the second operation modes the power source unit is caused to operate in, and causes the switching unit to perform switching so that the first inductor is used in the power source unit when operating in the first operation mode and the second inductor is used in the power source unit when operating in the second operation mode.

15 Claims, 7 Drawing Sheets

(51) Int. Cl.
*H02M 3/157* (2006.01)
*H02M 1/00* (2006.01)

(58) Field of Classification Search
USPC .......................................... 323/222, 282–285
See application file for complete search history.

(56) References Cited

U.S. PATENT DOCUMENTS

| | | | |
|---|---|---|---|
| 2005/0184712 A1* | 8/2005 | Wei ....................... | H02M 3/156 |
| | | | 323/282 |
| 2007/0096703 A1* | 5/2007 | Jain ....................... | H02M 3/158 |
| | | | 323/282 |
| 2018/0097438 A1* | 4/2018 | Iijima ..................... | H02M 1/14 |
| 2018/0375430 A1* | 12/2018 | Kwak ..................... | H02M 1/32 |

FOREIGN PATENT DOCUMENTS

| | | |
|---|---|---|
| JP | 2009-225592 A | 10/2009 |
| WO | 2016/194626 A1 | 12/2016 |

\* cited by examiner

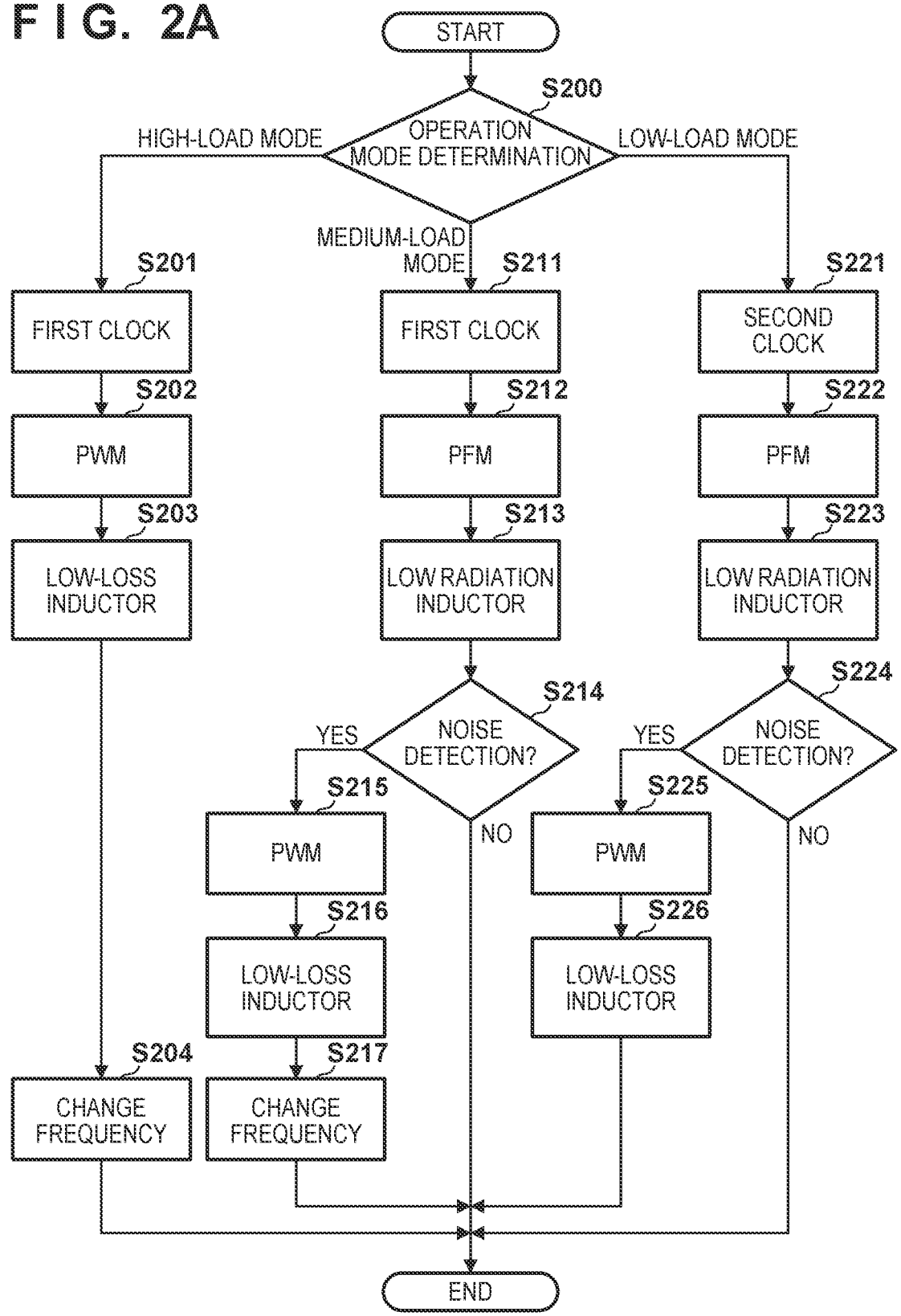

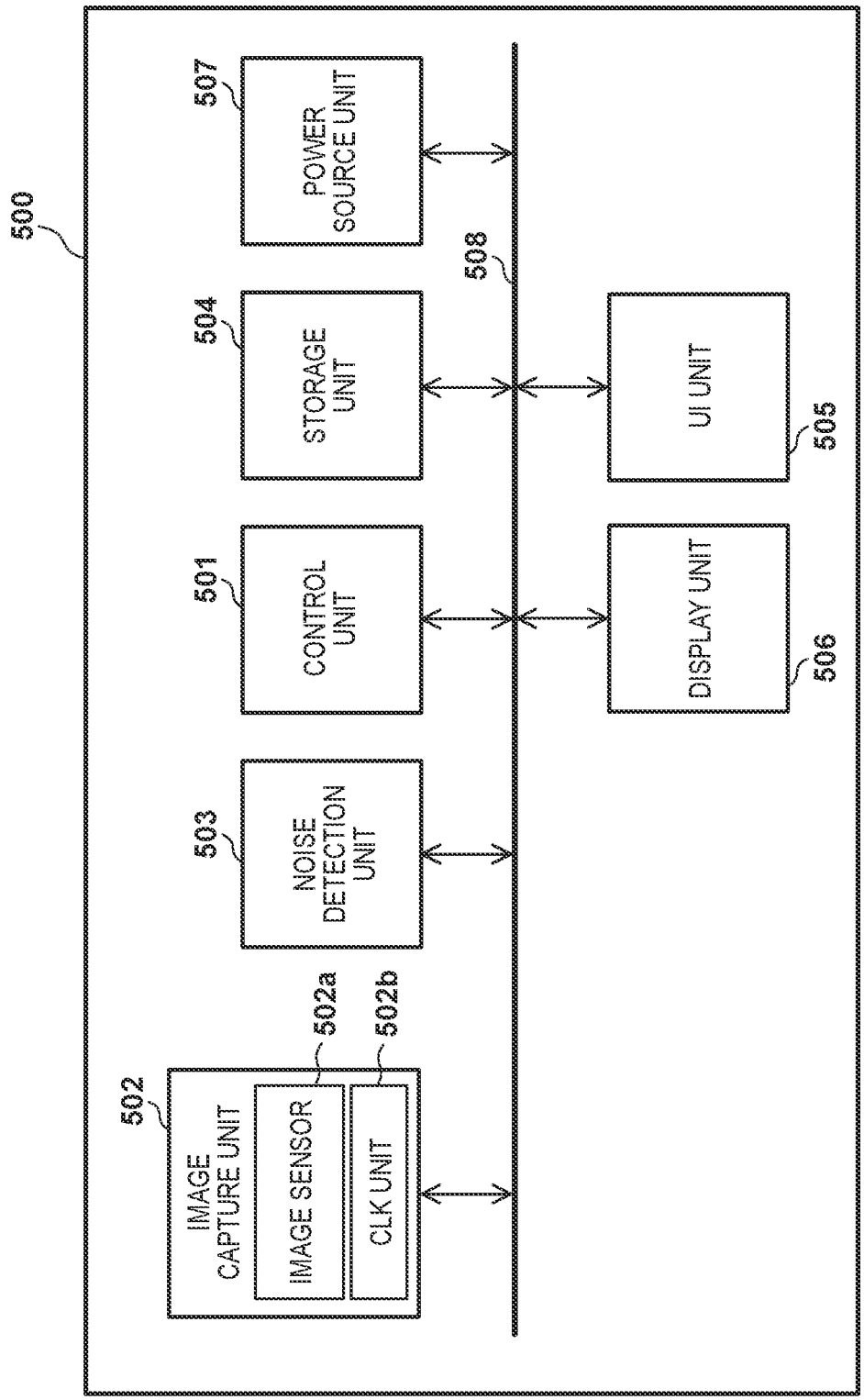

US 11,063,507 B2

ELECTRONIC APPARATUS CAPABLE OF SUPPRESSING NEGATIVE EFFECTS OF A SWITCHING OPERATION OF A POWER SOURCE AND CONTROL METHOD

CROSS-REFERENCE TO RELATED APPLICATIONS

This application is a Continuation of International Patent Application No. PCT/JP2018/041972, filed Nov. 13, 2018, which claims the benefit of Japanese Patent Application No. 2017-220839, filed Nov. 16, 2017, both of which are hereby incorporated by reference herein in their entirety.

BACKGROUND

Field of the Invention

Aspects of the disclosure relate to, for example, an electronic apparatus including a power source unit that operates as a switching regulator and a control method therefor.

Description of the Related Art

A switching regulator used in an electronic apparatus, such as a digital camera, is required to have high conversion efficiency in a wide range of load regions, from a high-load state in which a large amount of power is supplied to a low-load state in which a small amount of power is supplied. In general, the switching regulator operates in a PWM (Pulse width Modulation) mode. There is a problem in that, in the low-load state, the switching regulator operating in the PWM mode has reduced conversion efficiency because the power loss of the switching regulator itself is relatively large compared to the power consumption of a load portion. In view of this, to improve the reduced conversion efficiency in the low-load state, a switching regulator that switches from the PWM mode to a PFM (Pulse Frequency Modulation) mode in the low-load state is envisioned. Such a switching regulator can operate in the PWM mode in the high-load state and operate in the PFM mode in the low-load state, and is thus anticipated to be capable of realizing high conversion efficiency in a wide range of load regions. Japanese Patent Laid-Open No. 2008-92712 describes a method of reducing ripple voltage that occurs at the time of transition from PFM control to PWM control.

To mount such a switching regulator on an electronic apparatus, such as a digital camera, the negative effects of a switching operation of the switching regulator on components (e.g., an image capture unit) of the electronic apparatus need to be taken into consideration.

SUMMARY

According to an aspect of the embodiments, an electronic apparatus and a control method can reduce the negative effects of a switching operation of a power source unit capable of operating in a PWM mode or a PFM mode on components (e.g., an image capture unit) of the electronic apparatus.

According to an aspect of the embodiments, there is provided an electronic apparatus comprising: a power source unit including a first inductor, a second inductor that is different from the first inductor, and a switching unit that performs switching so that one of the first inductor and the second inductor is used, wherein the power source unit is capable of operating in a first operation mode or a second operation mode that is different from the first operation mode; and a control unit that determines which one of the first operation mode and the second operation mode the power source unit is caused to operate in, and causes the switching unit to perform switching so that the first inductor is used in the power source unit in a case where the power source unit operates in the first operation mode and the second inductor is used in the power source unit in a case where the power source unit operates in the second operation mode.

According to an aspect of the embodiments, there is provided a method comprising: determining which one of a first operation mode and a second operation mode a power source unit is caused to operate in; and performing control causing a switching unit to perform switching so that a first inductor is used in the power source unit when causing in a case where the power source unit to operate operates in the first operation mode, and a second inductor that is different from the first inductor is used in the power source unit when causing in a case where the power source unit to operate operates in the second operation mode.

According to an aspect of the embodiments, there is provided a non-transitory storage medium storing a program causing a computer to execute a method, the method comprising: determining which one of a first operation mode and a second operation mode a power source unit is caused to operate in; and causing a switching unit to perform switching so that a first inductor is used in the power source unit in a case where the power source unit operates in the first operation mode and a second inductor different from the first inductor is used in the power source unit in a case where the power source unit operates in the second operation mode.

Further aspects of the embodiments will become apparent from the following embodiments.

BRIEF DESCRIPTION OF THE DRAWINGS

FIG. 2A is a flowchart for illustrating a first operation example of the power source unit 507 according to the first embodiment.

FIG. 5 is a block diagram for illustrating components of an electronic apparatus 500 according to the first embodiment.

DESCRIPTION OF THE EMBODIMENTS

Figure 1A:
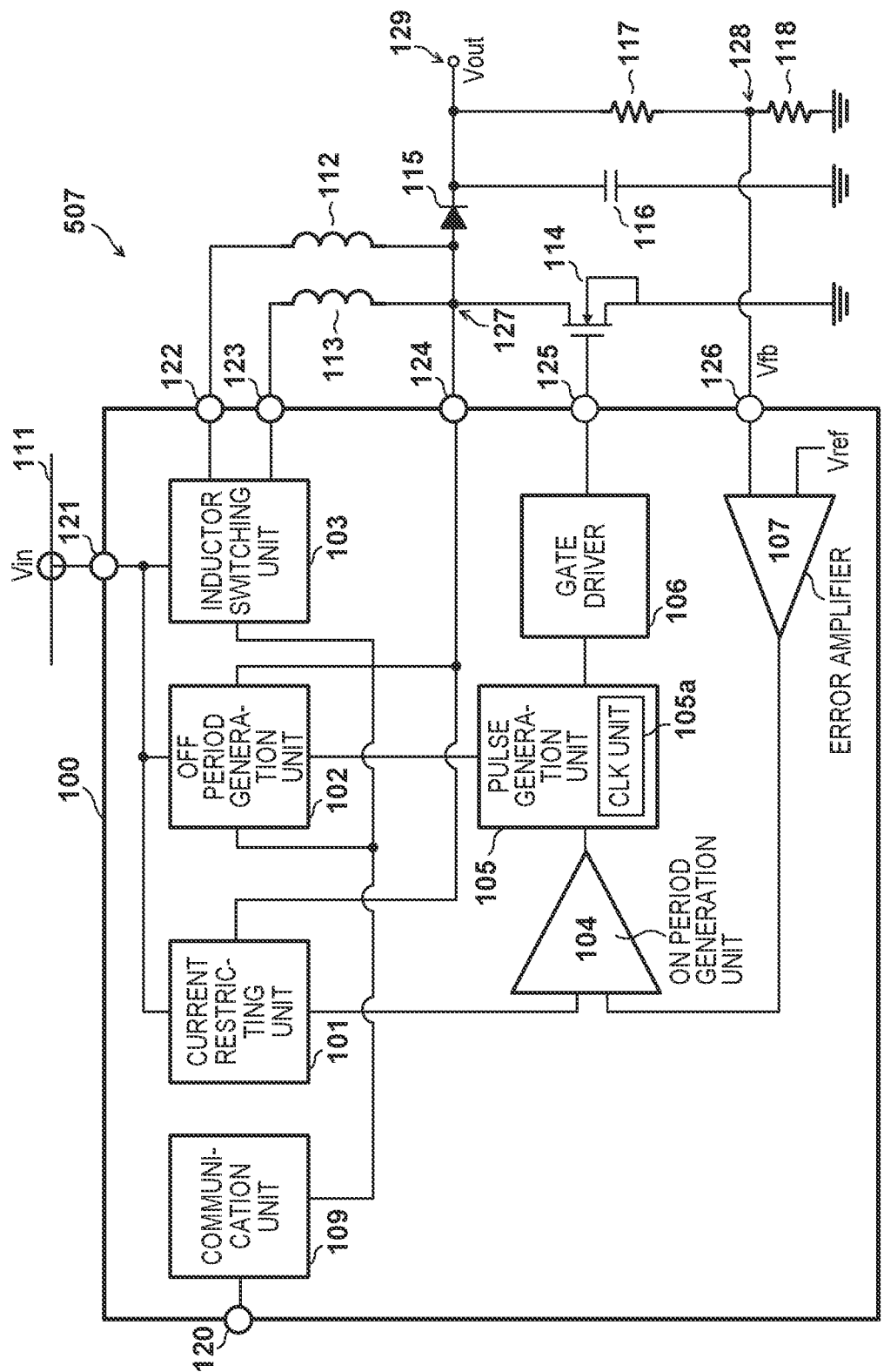
FIG. 1A is a block diagram for illustrating a first example of components of a power source unit 507 according to a first embodiment.

The following describes aspects and embodiments of the present invention with reference to the drawings. However, the aspects of the present invention are not limited to the following embodiments.

First Embodiment

Components of an electronic apparatus 500 according to a first embodiment will be described with reference to FIG. 5. The electronic apparatus 500 can operate as an image capture apparatus (e.g., a digital camera, a digital video camera, a mobile telephone, a smartphone, or the like). The electronic apparatus 500 includes at least a control unit 501, an image sensor 502a, a noise detection unit 503, a storage unit 504, a UI unit 505, a display unit 506, and a power source unit 507.

The control unit 501 includes a memory in which programs for controlling the components of the electronic apparatus 500 are stored, and a processor that controls the components of the electronic apparatus 500 by executing the programs stored in that memory. The control unit 501 can control the entire electronic apparatus 500 using the programs stored in the memory and the processor. The control unit 501 and other components of the electronic apparatus 500 are connected to each other via a system bus 508. The control unit 501 controls other components by transmitting instructions, setting information, or the like to other components via the system bus 508. Other components perform a predetermined process in accordance with instructions, setting information, or the like that have been received from the control unit 501 via the system bus 508. Information indicating the results of the predetermined process performed by other components (e.g., whether the predetermined process has been executed, and information obtained through the predetermined process), information indicating the states of other components, or the like is transmitted from other components to the control unit 501 via the system bus 508.

An image capture unit 502 includes a lens unit (not shown), the image sensor 502a, an A/D converter (not shown), an image processing unit (not shown), a CLK unit 502b, or the like. The image sensor 502a is, for example, a CMOS (Complementary Metal Oxide Semiconductor) image sensor. An optical image of a subject is formed on an image capture plane of the image sensor 502a via the lens unit. Photoelectric conversion elements are arranged in a matrix on the image capture plane of the image sensor 502a. Using the photoelectric conversion elements, the image sensor 502a generates an electrical signal corresponding to the optical image formed on the image capture plane. The electrical signal generated by the image sensor 502a is supplied to the A/D converter. The A/D converter converts the electrical signal supplied from the image sensor 502a from an analog signal to a digital signal. The digital signal generated by the A/D converter is supplied to the image processing unit. The image processing unit generates image data of a predetermined format (moving image data or still image data) from the digital signal generated by the A/D converter. Accordingly, image data (moving image data or still image data) of an image (a still image or moving images) captured by the image sensor 502a is generated by the image capture unit 502. The image data generated by the image capture unit 502 is supplied to the noise detection unit 503, the storage unit 504, and the display unit 506. The CLK unit 502b is a clock signal generation unit that generates a clock signal A or B used by the image sensor 502a, the A/D converter, the image processing unit, or the like. The image sensor 502a, the A/D converter, the image processing unit, or the like operate in synchronization with the clock signal A or B. The CLK unit 502b normally generates the clock signal A. The CLK unit 502b generates the clock signal B when an instruction that requests the CLK unit 502b to generate the clock signal B has been received from the control unit 501. The frequency of the clock signal A may be any frequency as long as it is a frequency that is different from the frequency of the clock signal B. However, it is assumed that the frequency of the clock signal B is the same as a predetermined frequency, which will be described later, and is a frequency that is different from the frequency of the clock signal A.

The noise detection unit 503 detects whether vertical-stripe noise or horizontal-stripe noise has occurred in the image data generated by the image capture unit 502 by analyzing the image data generated by the image capture unit 502. The noise detection unit 503 notifies the control unit 501 of the result of noise detection by the noise detection unit 503. Vertical-stripe noise is a phenomenon in which, when the image data generated by the image capture unit 502 is displayed on the display unit 506 or another display apparatus, vertical lines are visible on the captured image. Horizontal-stripe noise is a phenomenon in which, when the image data generated by the image capture unit 502 is displayed on the display unit 506 or another display apparatus, horizontal lines are visible on the captured image.

The storage unit 504 stores image data generated by the image capture unit 502 or the like in a storage medium (e.g., a memory card), and reads out image data designated by the control unit 501 or the like from this storage medium. Image data stored in the storage medium of the storage unit 504 may either be still image data or moving image data. The storage medium of the storage unit 504 may be removable from the electronic apparatus 500, or may be disposed inside the electronic apparatus 500 so that it cannot be easily removed from the electronic apparatus 500.

The UI (User Interface) unit 505 includes various operation buttons, a touchscreen, or the like. The touchscreen of the UI unit 505 is mounted on, for example, the display unit 506. A user causes the electronic apparatus 500 to execute a desired operation by operating the UI unit 505.

The display unit 506 displays, for example, image data (moving image data or still image data) generated by the image capture unit 502. The display unit 506 further displays information (icons, messages, or the like) indicating, for example, the state of the electronic apparatus 500. The display unit 506 includes, for example, a liquid crystal panel, an LED panel, or the like.

The power source unit 507 converts voltage supplied from a power source, such as a battery, into a predetermined voltage, and supplies the predetermined voltage to each component of the electronic apparatus 500. The power source unit 507 can operate in a PWM mode (Pulse Width Modulation mode), and can also operate in a PFM mode (Pulse Frequency Modulation mode). Furthermore, the power source unit 507 can perform a switching operation in accordance with a first clock signal or a second clock signal. The first clock signal is a clock signal of a first frequency, and the second clock signal is a clock signal of a second frequency that is lower than the first frequency. Components of the power source unit 507 will be described later with reference to FIG. 1A or FIG. 1B.

Figure 4A:
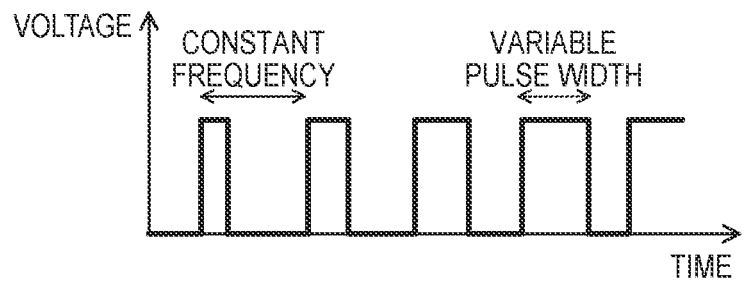
FIG. 4A is a diagram for illustrating a switching waveform of PWM.

FIG. 4A is a diagram showing one example of a switching waveform in the case where the power source unit 507 is caused to operate in the PWM mode. The horizontal axis of FIG. 4A represents time, and the vertical axis of FIG. 4A represents voltage. In the PWM mode, a switching pulse has a constant frequency, and the switching pulse changes in width.

Figure 4B:
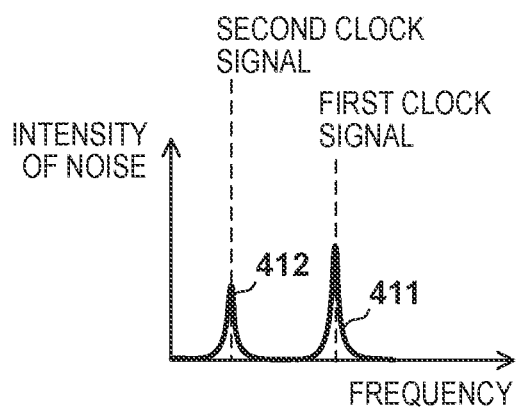
FIG. 4B is a diagram for illustrating frequency bands of switching noise in PWM.

FIG. 4B is a diagram showing frequency bands of switching noise that occurs when the power source unit 507 operating in the PWM mode performs a switching operation in accordance with the first clock signal or the second clock signal. The horizontal axis of FIG. 4B represents the frequency, and the vertical axis of FIG. 4B represents the intensity of switching noise. A frequency band 411 denotes a frequency band of switching noise that occurs when the power source unit 507 operating in the PWM mode performs a switching operation in accordance with the first clock signal. As indicated by the frequency band 411, switching noise is significantly intense at a peak frequency (corresponding to the first frequency), and decreases with the peak frequency at the center. A frequency band 412 denotes a frequency band of switching noise that occurs when the power source unit 507 operating in the PWM mode performs a switching operation in accordance with the second clock signal. As indicated by the frequency band 412, switching noise is significantly intense at a peak frequency (corresponding to the second frequency), and decreases with the peak frequency at the center. As stated earlier, the first clock signal is a clock signal of the first frequency, and the second clock signal is a clock signal of the second frequency that is lower than the first frequency.

Switching noise may exert negative effects when the frequency of the clock signal B generated by the CLK unit 502b overlaps the peak frequency of the frequency band 411 or a frequency that generates noise of approximately the same intensity as the peak of the frequency band 411. Switching noise may also exert negative effects when the frequency of the clock signal B generated by the CLK unit 502b overlaps the peak frequency of the frequency band 412 or a frequency that generates noise of approximately the same intensity as the peak of the frequency band 412. Then, if an electrical signal generated by the image sensor 502a becomes distorted due to these negative effects, there is a risk that vertical-stripe noise or horizontal-stripe noise will occur in image data generated by the image capture unit 502.

As can be understood from FIG. 4B, in the PWM mode, the frequencies that generate noise of approximately the same intensity as the peak of the frequency band 411 are limited, and the frequencies that generate noise of approximately the same intensity as the peak of the frequency band 412 are also limited. Therefore, there is a larger number of frequencies that do not overlap any of the peak frequencies of the frequency bands 411 and 412, the frequencies that generate noise of approximately the same intensity as the peak of the frequency band 411, the frequencies that generate noise of approximately the same intensity as the peak of the frequency band 412, and their harmonics. In view of this, in the first embodiment, one of these frequencies is selected as a frequency of the clock signal B generated by the CLK unit 502b, and the selected frequency is referred to as a "predetermined frequency". The predetermined frequency is one of the frequencies that do not overlap any of the peak frequencies of the frequency bands 411 and 412, the frequencies that generate noise of approximately the same intensity as the peak of the frequency band 411, the frequencies that generate noise of approximately the same intensity as the peak of the frequency band 412, and their harmonics. When the frequency of the clock signal B generated by the CLK unit 502b is the predetermined frequency, the effects of switching noise on an electrical signal generated by the image sensor 502a is suppressed. As a result, the occurrence of vertical-stripe noise or horizontal-stripe noise in image data generated by the image capture unit 502 can be mitigated or prevented. Therefore, in the first embodiment, when the power source unit 507 operates in the PWM mode, the control unit 501 changes the clock signal used by the image sensor 502a or the like from the clock signal A to the clock signal B.

Figure 4C:
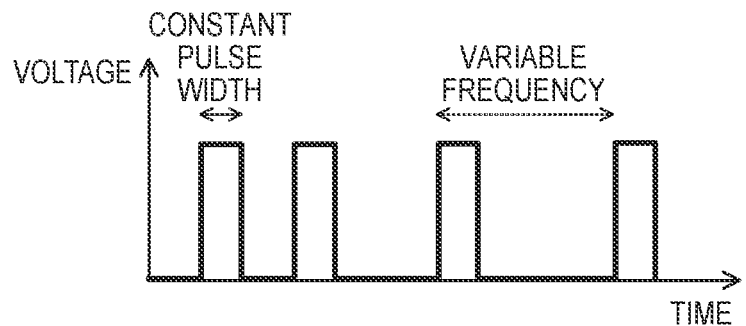
FIG. 4C is a diagram for illustrating a switching waveform of PFM.

FIG. 4C is a diagram showing one example of a switching waveform for the case where the power source unit 507 is caused to operate in the PFM mode. The horizontal axis of FIG. 4C represents time, and the vertical axis of FIG. 4C represents voltage. In the PFM mode, a switching pulse has a constant width, and the switching pulse changes in frequency.

Figure 4D:
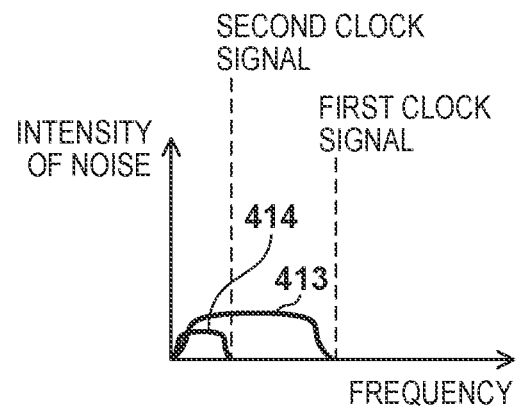
FIG. 4D is a diagram for illustrating frequency bands of switching noise in PFM.

FIG. 4D is a diagram showing frequency bands of switching noise that occurs when the power source unit 507 operating in the PFM mode performs a switching operation in accordance with the first clock signal or the second clock signal. The horizontal axis of FIG. 4D represents the frequency, and the vertical axis of FIG. 4D represents the intensity of switching noise. A frequency band 413 denotes a frequency band of switching noise that occurs when the power source unit 507 operating in the PFM mode performs a switching operation in accordance with the first clock signal. As indicated by the frequency band 413, switching noise occurs in a wide range of frequencies equal to or lower than the first frequency. A frequency band 414 denotes a frequency band of switching noise that occurs when the power source unit 507 operating in the PFM mode performs a switching operation in accordance with the second clock signal. As indicated by the frequency band 414, switching noise occurs in a wide range of frequencies equal to or lower than the second frequency.

As can be understood from FIG. 4D, in the PFM mode, the frequencies that generate noise of approximately the same intensity as the peak of the frequency band 413 are distributed over a wide range, and the frequencies that generate noise of approximately the same intensity as the peak of the frequency band 414 are also distributed over a wide range. Therefore, there are few frequencies that do not overlap any of the peak frequencies of the frequency bands 413 and 414, the frequencies that generate noise of approximately the same intensity as the peak of the frequency band 413, the frequencies that generate noise of approximately the same intensity as the peak of the frequency band 414, and their harmonics. Therefore, in the first embodiment, when the power source unit 507 operates in the PFM mode, the control unit 501 does not change the clock signal used by the image sensor 502a or the like from the clock signal A to the clock signal B. Instead, as will be described later, a switching operation is performed using a low-radiation inductor 112 with relatively low electromagnetic radiation. By using the low-radiation inductor 112, the effects of switching noise on an electrical signal generated by the image sensor 502a are suppressed, and thus the occurrence of vertical-stripe noise or horizontal-stripe noise in image data generated by the image capture unit 502 can be mitigated or prevented. As will be described later, the low-radiation inductor 112 has large resistance components compared to a low-loss inductor 113, which has relatively small resistance components. Therefore, in terms of a reduction in power loss in an inductor, using the low-radiation inductor 112 is disadvantageous compared to a case where the low-loss inductor 113 is used. However, as the power source unit 507 is caused to operate in the PFM mode when the load on the power source unit 507 is not too high, power consumption can be cut down sufficiently.

Next, a first example of the components of the power source unit 507 according to the first embodiment will be described with reference to FIG. 1A.

The power source unit 507 shown in FIG. 1A is a step-up power source unit that steps up an input voltage (power supply voltage) Vin supplied from a power source 111 to a voltage higher than the input voltage Vin, and outputs the voltage that has been stepped up from an output terminal 129. The power source 111 may be a battery, or may be an AC adapter. When the power source 111 is a battery, the input voltage Vin is, for example, 3.7 V or 7.4 V; however, no limitation is intended by this. An output voltage is, for example, 10 V; however, no limitation is intended by this. The first embodiment will be described using an example in which the input voltage Vin is 3.7 V and the output voltage Vout is 10 V.

As shown in FIG. 1A, the power source unit 507 includes a power source control unit 100, the low-radiation inductor 112, the low-loss inductor 113, and a switching FET (Field Effect Transistor) 114. The power source unit 507 further includes a rectifying diode 115, a rectifying capacitor 116, an upper feedback resistor 117, a lower feedback resistor 118, and the output terminal 129. The power source control unit 100 includes a current restricting unit 101, an off period generation unit 102, an inductor switching unit 103, an on period generation unit 104, a pulse generation unit 105, a gate driver 106, an error amplifier 107, a communication unit 109, and terminals 120 to 126. The pulse generation unit 105 includes a CLK unit 105a. In accordance with an instruction from the control unit 501, the CLK unit 105a generates one of the first clock signal and the second clock signal.

The current restricting unit 101, the off period generation unit 102, and the inductor switching unit 103 are connected to the power source 111 via the terminal 121. The inductor switching unit 103 is connected to one end of the low-radiation inductor 112 via the terminal 122. The inductor switching unit 103 is also connected to one end of the low-loss inductor 113 via the terminal 123. The inductor switching unit 103 switches between connection of one end of the low-radiation inductor 112 to the power source 111, and connection of one end of the low-loss inductor 113 to the power source 111.

The other end of the low-radiation inductor 112, the other end of the low-loss inductor 113, an anode of the rectifying diode 115, and a drain of the switching FET 114 are connected to one another. Anode 127, which is connected to the other end of the low-radiation inductor 112, the other end of the low-loss inductor 113, the anode of the rectifying diode 115, and the drain of the switching FET 114, is connected to the current restricting unit 101 and the off period generation unit 102 via the terminal 124.

A gate of the switching FET 114 is connected to the gate driver 106 via the terminal 125. A source of the switching FET 114 is connected to the ground potential. A cathode of the rectifying diode 115 is connected to one end of the rectifying capacitor 116, one end of the upper feedback resistor 117, and the output terminal 129. The other end of the rectifying capacitor 116 is connected to the ground potential. The other end of the upper feedback resistor 117 is connected to one end of the lower feedback resistor 118.

The other end of the lower feedback resistor 118 is connected to the ground potential. A node 128, which is connected to the other end of the upper feedback resistor 117 and one end of the lower feedback resistor 118, is connected to one of the input terminals of the error amplifier 107 via the terminal 126. The communication unit 109 can communicate with the control unit 501 or the like via the terminal 120.

The power source control unit 100 steps up voltage by switching the switching FET 114, and outputs the output voltage Vout obtained by the step-up via the output terminal 129. The voltage of the node 128 is a voltage obtained by dividing the output voltage Vout using the upper feedback resistor 117 and the lower feedback resistor 118. The voltage of the node 128 is input, as a feedback voltage Vfb, to one of the input terminals of the error amplifier 107 via the terminal 126. A reference voltage Vref is applied to the other input terminal of the error amplifier 107. The reference voltage Vref is, for example, generated inside the power source control unit 100. It is assumed that the reference voltage Vref is, for example, 1.0 V. The error amplifier 107 compares the feedback voltage Vfb with the reference voltage Vref, and supplies a signal corresponding to the result of comparison to one of the input terminals of the on period generation unit 104. The power source control unit 100 controls an on period and an off period of the switching FET 114 so that the feedback voltage Vfb matches the reference voltage Vref. When the feedback voltage Vfb is lower than the reference voltage Vref, the power source control unit 100 increases the output voltage Vout by increasing the switching frequency or the on duty cycle of the switching FET 114. On the other hand, when the feedback voltage Vfb is equal to or higher than the reference voltage Vref, the power source control unit 100 reduces the output voltage Vout by reducing the switching frequency or the on duty cycle of the switching FET 114. By performing such an operation, the power source control unit 100 maintains the output voltage Vout constant.

The current restricting unit 101 detects a current flowing in the power source unit 507 based on the voltages at both ends of the low-radiation inductor 112 or the voltages at both ends of the low-loss inductor 113. When the current flowing in the power source unit 507 becomes equal to or higher than a predetermined value, the current restricting unit 101 supplies a signal to place the switching FET 114 in an off state to the on period generation unit 104.

As stated earlier, the power source unit 507 is a step-up power source. Therefore, there is a need to discharge energy that has been accumulated in the low-radiation inductor 112 or the low-loss inductor 113 during a period in which the switching FET 114 is turned on to the output terminal 129 side during a period in which the switching FET 114 is turned off. That is to say, the power source unit 507 cannot step up voltage without providing a period in which the switching FET 114 is turned off. Therefore, the off period generation unit 102 generates a cyclic signal for cyclically generating the off period, which is a period in which the switching FET 114 is placed in the off state, and supplies the generated signal to the pulse generation unit 105. Based on a signal supplied from the off period generation unit 102 and a signal supplied from the on period generation unit 104, the pulse generation unit 105 generates a switching pulse that is synchronous with the first clock signal or the second clock signal generated by the CLK unit 105a. The first clock signal and the second clock signal have a frequency of, for example, several MHz to several tens of MHz. The pulse generation unit 105 supplies the generated switching pulse to the gate driver 106. The off period generation unit 102 can detect a current flowing in the power source unit 507 based on the voltages at both ends of the low-radiation inductor 112 or the voltages at both ends of the low-loss inductor 113. When the current flowing in the power source unit 507 is lower than a predetermined value, the off period generation unit 102 generates a signal that places the switching FET 114 in the off state throughout a period that is equal to or longer than a period equivalent to one cycle of the switching pulse. With such a signal supplied from the off period generation unit 102 to the pulse generation unit 105, the intermittent switching pulse is emitted by the pulse generation unit 105. With such an intermittent switching pulse supplied to the gate of the switching FET 114 via the gate driver 106, power loss caused by a switching operation is reduced, and the conversion efficiency in a low-load state can be improved.

The on period generation unit 104 generates a signal for generating the on period, which is a period in which the switching FET 114 is placed in an on state, based on the signal supplied from the error amplifier 107, and supplies the generated signal to the pulse generation unit 105. When the output voltage Vout is relatively low, the on period generation unit 104 generates a signal that extends the on period of the switching FET 114. When the output voltage Vout is relatively high, the on period generation unit 104 generates a signal that shortens the on period of the switching FET 114 and extends an interval between the on period and the next on period.

Based on the switching pulse supplied from the pulse generation unit 105, the gate driver 106 places the switching FET 114 in the on state or the off state. The gate capacitance of the switching FET 114 is relatively large. Therefore, the gate driver 106 is composed of, for example, a switching FET with high driving performance.

The communication unit 109 can communicate with the control unit 501 and or like. The power source control unit 100 controls each component of the power source unit 507 based on a signal supplied from the control unit 501 to the communication unit 109. Communication between the communication unit 109 and the control unit 501 is enabled by the use of, for example, an I²C (Inter-Integrated Circuit), an SPI (Serial Peripheral Interface), or the like. Also, communication between the communication unit 109 and the control unit 501 may be enabled by using a UART (Universal Asynchronous Receiver/Transmitter). The control unit 501 can control the inductor switching unit 103 via the communication unit 109. By controlling the inductor switching unit 103, the control unit 501 connects one of the low-radiation inductor 112 and the low-loss inductor 113 to the power source 111. The control unit 501 can control the off period generation unit 102 via the communication unit 109. For example, when the power source unit 507 operates in the PWM mode, the control unit 501 controls the off period generation unit 102 so that fixed PWM control is performed.

Figure 3A:
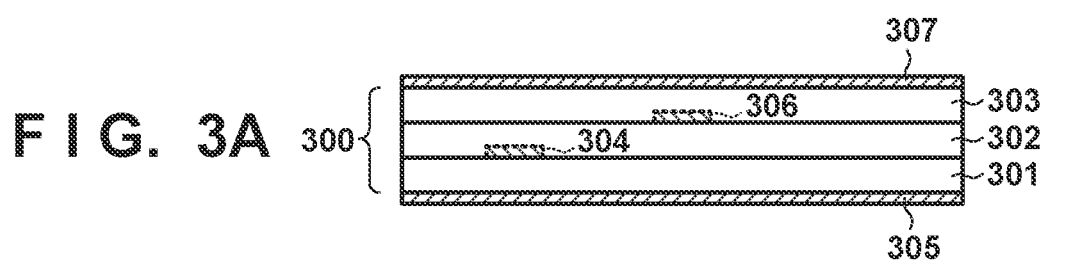
FIG. 3A is a diagram for illustrating one example of an inductor.
Figure 3B:
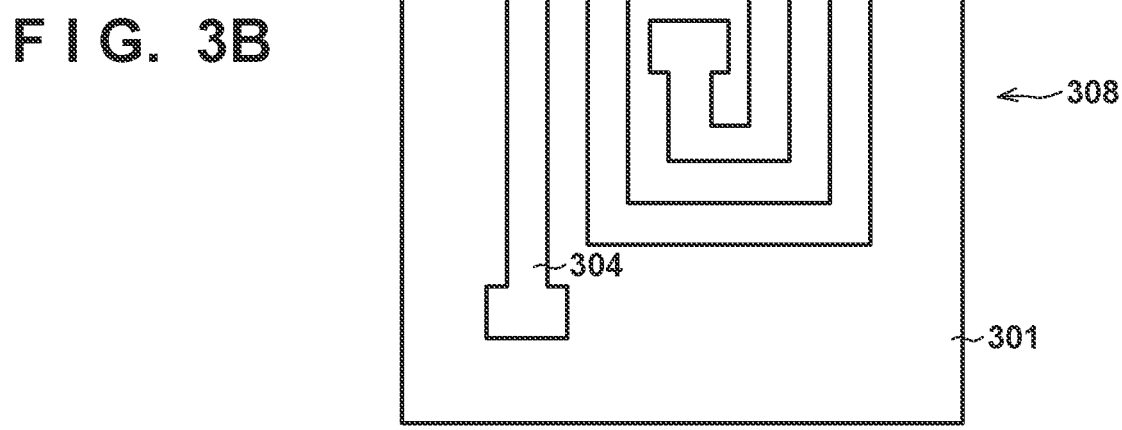
FIG. 3B is a diagram for illustrating one example of an inductor.

A description is now given of an example of inductors used in the power source unit 507 with reference to FIG. 3A to FIG. 3D. FIG. 3A and FIG. 3B are diagrams showing an inductor 308 including a conductive pattern 304 formed in a spiral shape on a substrate 300. FIG. 3A shows a side view, and FIG. 3B shows a plan view. As shown in FIG. 3A, the substrate 300 includes plate-shaped insulators 301 to 303. Although three plate-shaped insulators 301 to 303 are shown here, the number of insulators included in the substrate 300 is not limited to three. The spiral-shaped conductive pattern 304 is formed on a top surface of the insulator 301. A conductive film 305 is formed on the entirety of a bottom surface of the insulator 301. The insulator 302 is layered on the insulator 301 on which the conductive pattern 304 is formed. A conductive pattern 306 is formed on a top surface of the insulator 302. One end of the conductive pattern 306 is connected to one end of the spiral-shaped conductive pattern 304 through a via. The conductive pattern 306 can function as a draw-out line. The insulator 303 is layered on the insulator 302 on which the conductive pattern 306 is formed. A conductive film 307 is formed on the entirety of a top surface of the insulator 303. The inductor 308 is formed in the foregoing manner. The conductive film 305 and the conductive film 307 can be connected to the ground potential, for example. The conductive film 305 and the conductive film 307 can function as shields. As the conductive films 305 and 307, which can function as shields, are formed above and below the spiral-shaped conductive pattern 304, electromagnetic energy that radiates from the conductive pattern 304 at the time of switching is shielded by the conductive films 305 and 307. Note that, as the resistance of the conductive pattern 304 is relatively high, the loss of the inductor 308 is larger than that of a wound-wire inductor 311 and a chip inductor 313, which will be described later.

Figure 3C:
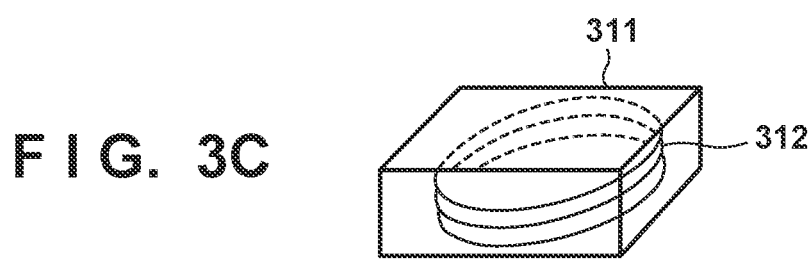
FIG. 3C is a diagram for illustrating one example of an inductor.
Figure 3D:
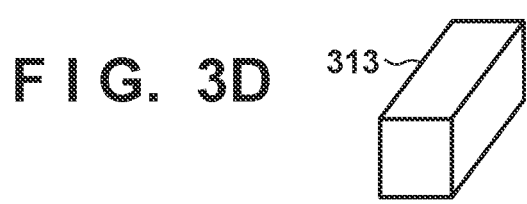
FIG. 3D is a diagram for illustrating one example of an inductor.

FIG. 3C is a diagram showing a wound-wire inductor 311 formed by winding a wire 312 around an iron core. FIG. 3D is a diagram showing a chip inductor 313. As the wound-wire inductor 311 and the chip inductor 313 both have smaller resistance components than the inductor 308 described using FIG. 3A and FIG. 3B, their loss is small. However, as neither the wound-wire inductor 311 nor the chip inductor 313 includes a shield, they are likely to dissipate noise.

As the low-radiation inductor 112, for example, the inductor 308 described using FIG. 3A and FIG. 3B can be used. As the low-loss inductor 113, for example, the wound-wire inductor 311 described using FIG. 3C, or the chip inductor 313 described using FIG. 3D, can be used.

In the power source unit 507, placing the switching FET 114 in the on state causes energy to be accumulated in the low-radiation inductor 112 or the low-loss inductor 113. Then, placing the switching FET 114 in the off state causes energy accumulated in the low-radiation inductor 112 or the low-loss inductor 113 to be discharged to the output side via the rectifying diode 115. By repeating such an operation, an output voltage Vout higher than the input voltage Vin is obtained. The rectifying diode 115 and the rectifying capacitor 116 constitute a filter, and this filter contributes to the stability of the output voltage Vout.

Next, a second example of the components of the power source unit 507 according to the first embodiment will be described with reference to FIG. 1B. Note that the components that are similar to the components shown in FIG. 1A are given the same reference numerals thereas in FIG. 1B, and their descriptions will be omitted. The following describes the components that are different from the components shown in FIG. 1A.

Figure 1B:
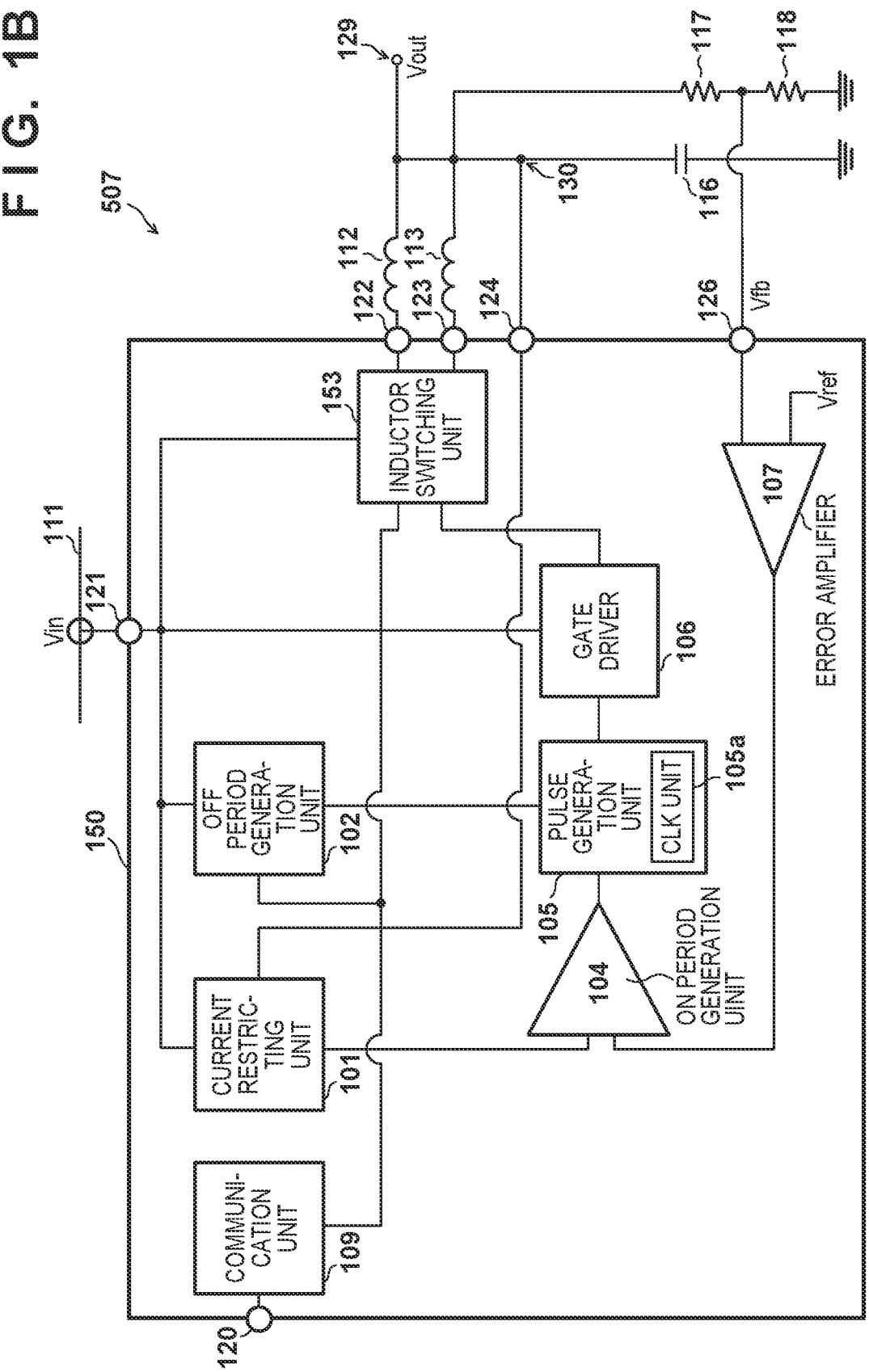
FIG. 1B is a block diagram for illustrating a second example of components of the power source unit 507 according to the first embodiment.

The power source unit 507 shown in FIG. 1B is a step-down power source unit that steps down an input voltage Vin supplied from the above-described power source 111 to a voltage lower than the input voltage Vin, and outputs the voltage that has been stepped down from an output terminal 129.

As shown in FIG. 1B, the power source unit 507 includes a power source control unit 150, a low-radiation inductor 112, a low-loss inductor 113, a rectifying capacitor 116, an upper feedback resistor 117, a lower feedback resistor 118, and the output terminal 129. The power source control unit 150 includes a current restricting unit 101, an off period generation unit 102, an inductor switching unit 153, an on period generation unit 104, a pulse generation unit 105, a gate driver 106, an error amplifier 107, and a communication unit 109. The power source control unit 150 further includes terminals 120 to 124 and 126.

The inductor switching unit 153 includes a switching FET. The inductor switching unit 153 switches between connection of one end of the low-radiation inductor 112 to a source of the switching FET, and connection of one end of the low-loss inductor 113 to the source of the switching FET. A drain of the switching FET is connected to the power source 111 via the terminal 121. The other end of the low-radiation inductor 112 and the other end of the low-loss inductor 113 are connected to one end of the rectifying capacitor 116 and the output terminal 129 without connection via a rectifying diode. The other end of the low-radiation inductor 112 and the other end of the low-loss inductor 113 are connected to the current restricting unit 101 via the terminal 124. In the above-described manner, the power source unit 507 may be a step-down power source unit.

Next, a first operation example of the power source unit 507 will be described with reference to FIG. 2A. FIG. 2A is a flowchart for illustrating the first operation example of the power source unit 507 according to the first embodiment.

First, a user performs an operation to place the power source 111 of the electronic apparatus 500 in an on state via the UI unit 505. Accordingly, the power source control unit 100 is activated, and the electronic apparatus 500 is activated. Thus, the image sensor 502a is also activated. After the electronic apparatus 500 is activated, the control unit 501 proceeds to step S200. The control unit 501 proceeds to step S200 also when the user has changed an operation mode of the electronic apparatus 500 after the electronic apparatus 500 is activated.

In step S200, the control unit 501 determines the operation mode of the electronic apparatus 500. The operation mode of the electronic apparatus 500 includes, for example, a reproduction mode, a still image capture mode, and moving image capture modes with different image sizes (or resolutions). The operation mode of the electronic apparatus 500 can be changed according to an operation made by a user on the UI unit 505. When the operation mode of the electronic apparatus 500 is the reproduction mode, the electronic apparatus 500 can reproduce still image data or moving image data requested by the user from the storage medium of the storage unit 504. When the operation mode of the electronic apparatus 500 is the still image capture mode, the electronic apparatus 500 can capture a still image of an image size (or resolution) requested by the user. Still image data of the captured still image is stored in the storage medium of the storage unit 504. Moving image capture modes with different image sizes (or resolutions) include, for example, a full-HD moving image capture mode and a 4K moving image capture mode. When the operation mode of the electronic apparatus 500 is the full-HD moving image capture mode, the electronic apparatus 500 can capture moving images of an image size (or resolution) having 1920 pixels horizontally×1080 pixels vertically (referred to as "full HD"). Moving image data of the captured moving images is stored in the storage medium of the storage unit 504. When the operation mode of the electronic apparatus 500 is the 4K moving image capture mode, the electronic apparatus 500 can capture moving images having 4096 pixels horizontally×2160 pixels vertically (referred to as "4K"). Moving image data of the captured moving images is stored in the storage medium of the storage unit 504.

Power consumption of the electronic apparatus 500 varies depending on the operation mode of the electronic apparatus 500. For example, in the reproduction mode, the image sensor 502a does not operate. Therefore, power consumption of the electronic apparatus 500 operating in the reproduction mode is relatively low. On the other hand, in the 4K moving image capture mode, the image sensor 502a and the control unit 501 operate in accordance with a high-speed clock signal. Therefore, power consumption of the electronic apparatus 500 operating in the 4K moving image capture mode is larger than power consumption of the electronic apparatus 500 operating in the reproduction mode, the still image capture mode, or the full-HD moving image capture mode, and is approximately several W (watts), for example. In the first embodiment and other embodiments, the 4K moving image capture mode and the full-HD moving image capture mode belong to a high-load mode, the still image capture mode belongs to a medium-load mode, and the reproduction mode belongs to a low-load mode. Power consumption in a case where the electronic apparatus 500 operates in the high-load mode is larger than power consumption of a case where the electronic apparatus 500 operates in the medium-load mode. Power consumption in a case where the electronic apparatus 500 operates in the medium-load mode is larger than power consumption in a case where the electronic apparatus 500 operates in the low-load mode. When the operation mode of the electronic apparatus 500 belongs to the high-load mode, the control unit 501 proceeds to step S201 ("high-load mode" in step S200). When the operation mode of the electronic apparatus 500 belongs to the medium-load mode, the control unit 501 proceeds to step S211 ("medium-load mode" in step S200). When the operation mode of the electronic apparatus 500 belongs to the low-load mode (e.g., the reproduction mode), the control unit 501 proceeds to step S221 ("low-load mode" in step S200).

As stated earlier, when the operation mode of the electronic apparatus 500 belongs to the high-load mode, the control unit 501 proceeds to step S201. In step S201, the control unit 501 controls the power source unit 507 so that the switching FET 114 executes a switching operation in accordance with the above-described first clock signal. For example, the control unit 501 transmits an instruction that requests the execution of the switching operation in accordance with the first clock signal to the communication unit 109. The communication unit 109 notifies the pulse generation unit 105 of this instruction. Upon receiving this instruction, the pulse generation unit 105 causes the CLK unit 105a to generate the first clock signal. Accordingly, the CLK unit 105a generates the first clock signal, and the switching FET 114 executes the switching operation in accordance with the first clock signal. Thereafter, the control unit 501 proceeds to step S202.

In step S202, the control unit 501 controls the power source unit 507 so that the power source unit 507 operates in the PWM mode. For example, the control unit 501 transmits an instruction that requests the power source unit 507 to operate in the PWM mode to the communication unit 109. The communication unit 109 notifies the off period generation unit 102 of this instruction. Upon receiving this instruction, the off period generation unit 102 operates in the PWM mode. Accordingly, the power source unit 507 operates in the PWM mode. Thereafter, the control unit 501 proceeds to step S203.

In step S203, the control unit 501 controls the inductor switching unit 103 so that the low-loss inductor 113 is used in the power source unit 507. For example, the control unit 501 transmits an instruction that requests the power source unit 507 to use the low-loss inductor 113 to the communication unit 109. The communication unit 109 notifies the inductor switching unit 103 of this instruction. Upon receiving this instruction, the inductor switching unit 103 connects one end of the low-loss inductor 113 and the power source 111. Accordingly, the low-loss inductor 113 is used in the power source unit 507, and power loss in the power source unit 507 is reduced. Thereafter, the control unit 501 proceeds to step S204.

In step S204, the control unit 501 changes the clock signal used by the image sensor 502a or the like from the clock signal A to the clock signal B. To this end, an instruction that requests the CLK unit 502b to generate the clock signal B is transmitted to the image capture unit 502. The image capture unit 502 notifies the CLK unit 502b of this instruction. Upon receiving this instruction, the CLK unit 502b starts generating the clock signal B. Accordingly, the frequency of the clock signal used by the image sensor 502a or the like is changed to the predetermined frequency. By thus changing the frequency of the clock signal used by the image sensor 502a and or like to the predetermined frequency, the effects of switching noise on an electrical signal generated by the image sensor 502a are suppressed. As a result, the occurrence of vertical-stripe noise or horizontal-stripe noise in image data generated by the image capture unit 502 can be mitigated or prevented. After the clock signal used by the image sensor 502a and or like has been changed from the clock signal A to the clock signal B, the flowchart shown in FIG. 2A ends.

As stated earlier, when the operation mode of the electronic apparatus 500 belongs to the medium-load mode, the control unit 501 proceeds to step S211. In step S211, the control unit 501 controls the power source unit 507 so that the switching FET 114 executes a switching operation in accordance with the above-described first clock signal. For example, the control unit 501 transmits an instruction that requests the execution of the switching operation in accordance with the first clock signal to the communication unit 109. The communication unit 109 notifies the pulse generation unit 105 of this instruction. Upon receiving this instruction, the pulse generation unit 105 causes the CLK unit 105a to generate the first clock signal. Accordingly, the CLK unit 105a generates the first clock signal, and the switching FET 114 executes the switching operation in accordance with the first clock signal. Thereafter, the control unit 501 proceeds to step S212.

In step S212, the control unit 501 controls the power source unit 507 so that the power source unit 507 operates in the PFM mode. For example, the control unit 501 transmits an instruction that requests the power source unit 507 to operate in the PFM mode to the communication unit 109. The communication unit 109 notifies the off period generation unit 102 of this instruction. Upon receiving this instruction, the off period generation unit 102 operates in the PFM mode. Accordingly, the power source unit 507 operates in the PFM mode. Thereafter, the control unit 501 proceeds to step S213.

In step S213, the control unit 501 does not change the clock signal used by the image sensor 502a and or like from the clock signal A to the clock signal B. Instead, the control unit 501 controls the inductor switching unit 103 so that the low-radiation inductor 112 is used in the power source unit 507. For example, the control unit 501 transmits an instruction that requests the power source unit 507 to use the low-radiation inductor 112 to the communication unit 109. The communication unit 109 notifies the inductor switching unit 103 of this instruction. Upon receiving this instruction, the inductor switching unit 103 connects one end of the low-radiation inductor 112 and the power source 111. Accordingly, the low-radiation inductor 112 is used in the power source unit 507. As stated earlier, the switching noise emitted by the low-radiation inductor 112 is smaller than the switching noise emitted by the low-loss inductor 113. Therefore, by controlling the inductor switching unit 103 so that the low-radiation inductor 112 is used in the power source unit 507, the occurrence of vertical-stripe noise or horizontal-stripe noise in captured image data can be mitigated or prevented. Thereafter, the control unit 501 proceeds to step S214.

In step S214, the control unit 501 causes the image sensor 502a to capture a still image or moving images, and causes the noise detection unit 503 to perform noise detection. The noise detection unit 503 detects whether vertical-stripe noise or horizontal-stripe noise has occurred in image data generated by the image capture unit 502. The result of noise detection is transmitted to the control unit 501. The control unit 501 determines whether vertical-stripe noise or horizontal-stripe noise has occurred in the image data generated by the image capture unit 502 based on the result of noise detection by the noise detection unit 503. If vertical-stripe noise or horizontal-stripe noise has not occurred in the image data generated by the image capture unit 502, the low-radiation inductor 112 is used in the power source unit 507 (NO in step S214). Accordingly, the occurrence of vertical-stripe noise or horizontal-stripe noise in the captured image data can be mitigated or prevented. Then, the flowchart shown in FIG. 2A ends. If vertical-stripe noise or horizontal-stripe noise has occurred in the image data generated by the image capture unit 502, the occurrence of vertical-stripe noise or horizontal-stripe noise in the captured image data cannot be reduced or prevented using the low-radiation inductor 112 (YES in step S214). Thereafter, in this case, the control unit 501 proceeds to step S215.

In step S215, the control unit 501 controls the power source unit 507 so that the power source unit 507 operates in the PWM mode. For example, the control unit 501 transmits an instruction that requests the power source unit 507 to operate in the PWM mode to the communication unit 109. The communication unit 109 notifies the off period generation unit 102 of this instruction. Upon receiving this instruction, the off period generation unit 102 operates in the PWM mode. This makes the power source unit 507 operate in the PWM mode. Accordingly, the power source unit 507 operates in the PWM mode. Thereafter, the control unit 501 proceeds to step S216.

In step S216, the control unit 501 controls the inductor switching unit 103 so that the low-loss inductor 113 is used in the power source unit 507, similarly to step S203. Accordingly, the low-loss inductor 113 is used in the power source unit 507, and power loss in the power source unit 507 is reduced. Thereafter, the control unit 501 proceeds to step S217.

In step S217, the control unit 501 changes the clock signal used by the image sensor 502a or the like from the clock signal A to the clock signal B, similarly to step S204. Accordingly, similarly to step S204, the occurrence of vertical-stripe noise or horizontal-stripe noise in image data generated by the image capture unit 502 can be mitigated or prevented. After the clock signal used by the image sensor 502a or the like has been changed from the clock signal A to the clock signal B, the flowchart shown in FIG. 2A ends.

As stated earlier, when the operation mode of the electronic apparatus 500 belongs to the low-load mode, the control unit 501 proceeds to step S221. In step S221, the control unit 501 controls the power source unit 507 so that the switching FET 114 executes a switching operation in accordance with the above-described second clock signal. For example, the control unit 501 transmits an instruction that requests the execution of the switching operation in accordance with the second clock signal to the communication unit 109. The communication unit 109 notifies the pulse generation unit 105 of this instruction. Upon receiving this instruction, the pulse generation unit 105 causes the CLK unit 105a to generate the second clock signal. Accordingly, the CLK unit 105a generates the second clock signal, and the switching FET 114 executes the switching operation in accordance with the second clock signal. Note that, as stated earlier, the frequency of the second clock signal is lower than the frequency of the first clock signal, and is several hundred kHz, for example. Thereafter, the control unit 501 proceeds to step S222.

In step S222, the control unit 501 controls the power source unit 507 so that the power source unit 507 operates in the PFM mode. For example, the control unit 501 transmits an instruction that requests the power source unit 507 to operate in the PFM mode to the communication unit 109. The communication unit 109 notifies the off period generation unit 102 of this instruction. Upon receiving this instruction, the off period generation unit 102 operates in the PFM mode. Accordingly, the power source unit 507 operates in the PFM mode. Thereafter, the control unit 501 proceeds to step S223.

In step S223, the control unit 501 does not change the clock signal used by the image sensor 502a or the like from the clock signal A to the clock signal B. Instead, the control unit 501 controls the inductor switching unit 103 so that the low-radiation inductor 112 is used in the power source unit 507, similarly to step S213. Accordingly, similarly to step S213, the occurrence of vertical-stripe noise or horizontal-stripe noise in captured image data can be mitigated or prevented. Thereafter, the control unit 501 proceeds to step S224.

In step S224, the control unit 501 causes the image sensor 502a to capture a still image or moving images, and causes the noise detection unit 503 to perform noise detection. The noise detection unit 503 detects whether vertical-stripe noise or horizontal-stripe noise has occurred in image data generated by the image capture unit 502. The result of noise detection by the noise detection unit 503 is transmitted to the control unit 501. The control unit 501 determines whether vertical-stripe noise or horizontal-stripe noise has occurred in the image data generated by the image capture unit 502 based on the result of noise detection. If vertical-stripe noise or horizontal-stripe noise has not occurred in the image data generated by the image capture unit 502, the low-radiation inductor 112 is used in the power source unit 507 (NO in step S224). Accordingly, the occurrence of vertical-stripe noise or horizontal-stripe noise in the captured image data can be mitigated or prevented. Then, the flowchart shown in FIG. 2A ends. If vertical-stripe noise or horizontal-stripe noise has occurred in the image data generated by the image capture unit 502, the occurrence of vertical-stripe noise or horizontal-stripe noise in the captured image data cannot be reduced or prevented using the low-radiation inductor 112 (YES in step S224). Thereafter, in this case, the control unit 501 proceeds to step S225.

In step S225, the control unit 501 controls the power source unit 507 so that the power source unit 507 operates in the PWM mode. For example, the control unit 501 transmits an instruction that requests the power source unit 507 to operate in the PWM mode to the communication unit 109. The communication unit 109 notifies the off period generation unit 102 of this instruction. Upon receiving this instruction, the off period generation unit 102 operates in the PWM mode. Accordingly, the power source unit 507 operates in the PWM mode. Thereafter, the control unit 501 proceeds to step S226.

In step S226, the control unit 501 controls the inductor switching unit 103 so that the low-loss inductor 113 is used in the power source unit 507, similarly to step S203. Accordingly, the low-loss inductor 113 is used in the power source unit 507, and power loss in the power source unit 507 is reduced. Then, the flowchart shown in FIG. 2A ends.

Figure 2B:
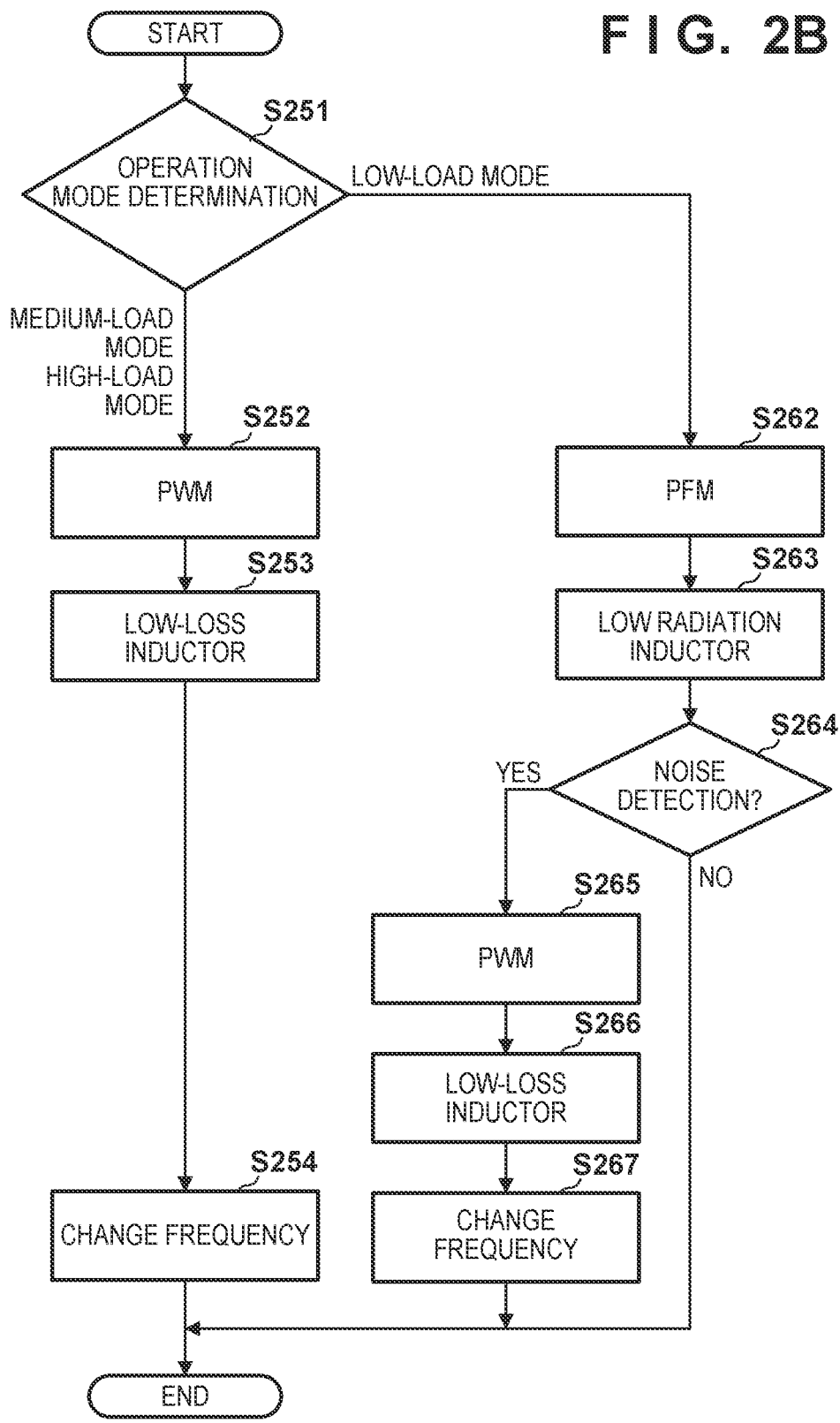
FIG. 2B is a flowchart for illustrating a second operation example of the power source unit 507 according to the first embodiment.

Next, a second operation example of the power source unit 507 will be described with reference to FIG. 2B. FIG. 2B is a flowchart for illustrating a second operation example of the power source unit 507 according to the first embodiment. In the operation example shown in FIG. 2B, unlike the operation example shown in FIG. 2A, the CLK unit 105a generates the first clock signal no matter which one of the high-load mode, the medium-load mode, and the low-load mode the operation mode of the electronic apparatus 500 belongs to.

First, a user performs an operation to place the power source 111 of the electronic apparatus 500 in an on state via the UI unit 505. Accordingly, the power source control unit 100 is activated, and the electronic apparatus 500 is activated. Thus, the image sensor 502a is also activated. After the electronic apparatus 500 is activated, the control unit 501 proceeds to step S251. The control unit 501 proceeds to step S251 also when the user has changed the operation mode of the electronic apparatus 500 after the electronic apparatus 500 is activated.

In step S251, the control unit 501 determines the operation mode of the electronic apparatus 500. As stated earlier, the operation mode of the electronic apparatus 500 includes, for example, the reproduction mode, the still image capture mode, and the moving image capture modes with different image sizes (or resolutions). The operation mode of the electronic apparatus 500 can be changed according to an operation made by the user on the UI unit 505. When the operation mode of the electronic apparatus 500 belongs to the above-described high-load mode, the control unit 501 proceeds to step S252 ("high-load mode" in step S251). When the operation mode of the electronic apparatus 500 belongs to the above-described medium-load mode, the control unit 501 proceeds to step S252 ("medium-load mode" in step S251). When the operation mode of the electronic apparatus 500 belongs to the above-described low-load mode, the control unit 501 proceeds to step S262 ("low-load mode" in step S251). As stated earlier, it is assumed that the 4K moving image capture mode and the full-HD moving image capture mode belong to the high-load mode, the still image capture mode belongs to the medium-load mode, and the reproduction mode belongs to the low-load mode.

As stated earlier, when the operation mode of the electronic apparatus 500 belongs to the high-load mode or the medium-load mode, the control unit 501 proceeds to step S252. In step S252, the control unit 501 controls the power source unit 507 so that the power source unit 507 operates in the PWM mode. For example, the control unit 501 transmits an instruction that requests the power source unit 507 to operate in the PWM mode to the communication unit 109. The communication unit 109 notifies the off period generation unit 102 of this instruction. Upon receiving this instruction, the off period generation unit 102 operates in the PWM mode. Accordingly, the power source unit 507 operates in the PWM mode. Thereafter, the control unit 501 proceeds to step S253.

In step S253, the control unit 501 controls the inductor switching unit 103 so that the low-loss inductor 113 is used in the power source unit 507, similarly to step S203. Accordingly, the low-loss inductor 113 is used in the power source unit 507, and power loss in the power source unit 507 is reduced. Thereafter, the control unit 501 proceeds to step S254.

In step S254, the control unit 501 changes the clock signal used by the image sensor 502a or the like from the clock signal A to the clock signal B, similarly to step S204. Accordingly, similarly to step S204, the occurrence of vertical-stripe noise or horizontal-stripe noise in image data generated by the image capture unit 502 can be mitigated or prevented. After the clock signal used by the image sensor 502a or the like has been changed from the clock signal A to the clock signal B, the flowchart shown in FIG. 2B ends.

As stated earlier, when the operation mode of the electronic apparatus 500 belongs to the low-load mode, the control unit 501 proceeds to step S262. In step S262, the control unit 501 controls the power source unit 507 so that the power source unit 507 operates in the PFM mode. For example, the control unit 501 transmits an instruction that requests the power source unit 507 to operate in the PWM mode to the communication unit 109. The communication unit 109 notifies the off period generation unit 102 of this instruction. Upon receiving this instruction, the off period generation unit 102 operates in the PWM mode. Accordingly, the power source unit 507 operates in the PFM mode. Thereafter, the control unit 501 proceeds to step S263.

In step S263, the control unit 501 does not change the clock signal used by the image sensor 502a or the like from the clock signal A to the clock signal B. Instead, the control unit 501 controls the inductor switching unit 103 so that the low-radiation inductor 112 is used in the power source unit 507, similarly to step S213. Accordingly, similarly to step S213, the occurrence of vertical-stripe noise or horizontal-stripe noise in captured image data can be mitigated or prevented. Thereafter, the control unit 501 proceeds to step S264.

In step S264, the control unit 501 causes the image sensor 502a to capture a still image or moving images, and causes the noise detection unit 503 to perform noise detection. The noise detection unit 503 detects whether vertical-stripe noise or horizontal-stripe noise has occurred in image data generated by the image capture unit 502. The result of noise detection is transmitted to the control unit 501. The control unit 501 determines whether vertical-stripe noise or horizontal-stripe noise has occurred in the image data generated by the image capture unit 502 based on the result of noise detection by the noise detection unit 503. If vertical-stripe noise or horizontal-stripe noise has not occurred in the image data generated by the image capture unit 502, the low-radiation inductor 112 is used in the power source unit 507 (NO in step S264). Accordingly, the occurrence of vertical-stripe noise or horizontal-stripe noise in the captured image data can be mitigated or prevented. Then, the flowchart shown in FIG. 2B ends. If vertical-stripe noise or horizontal-stripe noise has occurred in the image data generated by the image capture unit 502, the occurrence of vertical-stripe noise or horizontal-stripe noise in the captured image data cannot be reduced or prevented using the low-radiation inductor 112 (YES in step S264). Thereafter, in this case, the control unit 501 proceeds to step S265.

In step S265, the control unit 501 controls the power source unit 507 so that the power source unit 507 operates in the PWM mode. For example, the control unit 501 transmits an instruction that requests the power source unit 507 to operate in the PWM mode to the communication unit 109. The communication unit 109 notifies the off period generation unit 102 of this instruction. Upon receiving this instruction, the off period generation unit 102 operates in the PWM mode. Accordingly, the power source unit 507 operates in the PWM mode. Thereafter, the control unit 501 proceeds to step S266.

In step S266, the control unit 501 controls the inductor switching unit 103 so that the low-loss inductor 113 is used in the power source unit 507, similarly to step S203. Accordingly, the low-loss inductor 113 is used in the power source unit 507, and power loss in the power source unit 507 is reduced. Thereafter, the control unit 501 proceeds to step S267.

In step S267, the control unit 501 changes the clock signal used by the image sensor 502a or the like from the clock signal A to the clock signal B, similarly to step S204. Accordingly, similarly to step S204, the occurrence of vertical-stripe noise or horizontal-stripe noise in image data generated by the image capture unit 502 can be mitigated or prevented. After the clock signal used by the image sensor 502a or the like has been changed from the clock signal A to the clock signal B, the flowchart shown in FIG. 2B ends.

As described above, the first embodiment can provide the electronic apparatus 500 including the power source unit 507 that can operate in the PWM mode or the PFM mode. Furthermore, according to the first embodiment, when the power source unit 507 is made to operate in the PWM mode (a first operation mode), the low-loss inductor 113 (a first inductor) is used in the power source unit 507. Also, when the power source unit 507 is made to operate in the PWM mode, the clock signal used by the image sensor 502a or the like can be changed from the clock signal A to the clock signal B. On the other hand, when causing the power source unit 507 to operate in the PFM mode (a second operation mode), the clock signal used by the image sensor 502a or the like is not changed from the clock signal A to the clock signal B. Instead, the low-radiation inductor 112 (a second inductor), rather than the low-loss inductor 113, is used in the power source unit 507. Accordingly, in either the PWM mode or the PFM mode, the occurrence of vertical-stripe noise or horizontal-stripe noise in captured image data can be mitigated or prevented. As a result, the negative effects of the switching operation of the power source unit 507 on the components (e.g., the image capture unit 502) of the electronic apparatus 500 can be reduced.

Note that embodiments of the present invention are not limited to the above-described first embodiment. The first embodiment that has been changed or modified within a scope that does not depart from the essential spirit of the invention is also encompassed within embodiments of the present invention.

For example, although the first embodiment has been described using an exemplary case where, noise attributed to the switching operation of the power source unit 507 (corresponding to vertical-stripe noise or horizontal-stripe noise) is reduced or prevented among noise that occurs in image data generated by the image capture unit 502, no limitation is intended by this. For example, when the electronic apparatus 500 is an electronic apparatus that obtains sound, noise attributed to the switching operation of the power source unit 507 may be reduced or prevented among noise that occurs in sound data generated by a sound collection unit or the like of the electronic apparatus 500. In this case, the predetermined frequency may be any frequency as long as it is a frequency that can be used by the sound collection unit. Furthermore, the noise detection unit 503 detects whether noise attributed to the switching operation of the power source unit 507 has occurred in the sound data generated by the sound collection unit or the like of the electronic apparatus 500.

Second Embodiment

Various functions, processes, or methods described in the first embodiment can also be realized by a personal computer, a microcomputer, a CPU (central processing unit), a processor, or the like using a program. Hereinafter, in a second embodiment, the personal computer, the microcomputer, the CPU (central processing unit), the processor, or the like are referred to as a "computer X". Also, in the second embodiment, a program that is intended to control the computer X and is intended to realize various functions, processes, or methods described in the first embodiment is referred to as a "program Y".

Various functions, processes, or methods described in the first embodiment are realized by the computer X executing the program Y. In this case, the program Y is supplied to the computer X via a computer-readable storage medium. The computer-readable storage medium according to the second embodiment includes at least one of a hard disk apparatus, a magnetic storage apparatus, an optical storage apparatus, a magneto-optical storage apparatus, a memory card, a volatile memory, a nonvolatile memory, or the like. The computer-readable storage medium according to the second embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

What is claimed is:

1. An electronic apparatus comprising:
a power source unit including a first inductor, a second inductor that is different from the first inductor, and a switching unit that performs switching so that one of the first inductor and the second inductor is used, wherein the power source unit is capable of operating in a first operation mode or a second operation mode that is different from the first operation mode;
a control unit that determines whether the power source unit is caused to operate in the first operation mode or the second operation mode, and causes the switching unit to perform switching so that the first inductor is used in the power source unit in a case where the power source unit operates in the first operation mode and the second inductor is used in the power source unit in a case where the power source unit operates in the second operation mode; and
an image capture unit that captures an image,
wherein the control unit changes a clock signal used by the image capture unit to a clock signal of a predetermined frequency in a case where the power source unit operates in the first operation mode, and
wherein the predetermined frequency is a frequency that does not overlap a peak frequency of a frequency band of switching noise that occurs in the first operation mode or a frequency that does not overlap a harmonic of the peak frequency.

2. The electronic apparatus according to claim 1, further comprising a noise detection unit that detects noise,
wherein the control unit determines whether the power source unit is caused to operate in the first operation mode or the second operation mode based on the detected noise.

3. The electronic apparatus according to claim 1, wherein the first operation mode is a pulse width modulation mode, and
the second operation mode is a pulse frequency modulation mode.

4. The electronic apparatus according to claim 1, wherein the first inductor is a low-loss inductor that has smaller resistance components than the second inductor, and
the second inductor is a low-radiation inductor that has lower electromagnetic radiation than the first inductor.

5. The electronic apparatus according to claim 1, wherein the control unit determines to cause the power source unit to operate in the first operation mode in a case where an operation mode of the electronic apparatus is a high-load operation mode, and determines to cause the power source unit to operate in the second operation mode in a case where the operation mode of the electronic apparatus is a low-load operation mode.

6. The electronic apparatus according to claim 5, further comprising a clock unit that generates a first clock signal for a switching operation of the power source unit in a case where the operation mode of the electronic apparatus is the high-load operation mode, and generates a second clock signal different from the first clock signal in a case where the operation mode of the electronic apparatus is the high-load operation mode.

7. The electronic apparatus according to claim 6, wherein a frequency of the first clock signal is higher than a frequency of the second clock signal.

8. A method comprising:
determining whether a power source unit is caused to operate in a first operation mode or a second operation mode;
causing a switching unit to perform switching so that a first inductor is used in the power source unit in a case where the power source unit operates in the first operation mode and a second inductor different from the first inductor is used in the power source unit in a case where the power source unit operates in the second operation mode;
causing an image capture unit to capture an image; and
changing a clock signal used by the image capture unit to a clock signal of a predetermined frequency in a case where the power source unit operates in the first operation mode,
wherein the predetermined frequency is a frequency that does not overlap a peak frequency of a frequency band of switching noise that occurs in the first operation mode or a frequency that does not overlap a harmonic of the peak frequency.

9. The method according to claim 8, further comprising causing a noise detection unit to detect noise,
wherein whether the power source unit is caused to operate in the first operation mode or the second operation mode is determined based on the detected noise.

10. The method according to claim 8, wherein the first operation mode is a pulse width modulation mode, and
the second operation mode is a pulse frequency modulation mode.

11. The method according to claim 8, wherein the first inductor is a low-loss inductor that has smaller resistance components than the second inductor, and
the second inductor is a low-radiation inductor that has lower electromagnetic radiation than the first inductor.

12. The method according to claim 8, wherein the power source unit is included in an electronic device, and
wherein the power source unit is caused to operate in the first operation mode in a case where an operation mode of the electronic apparatus is a high-load operation mode, and the power source unit is caused to operate in the second operation mode in a case where the operation mode of the electronic apparatus is a low-load operation mode.

13. The method according to claim 12, further comprising:
causing a clock unit to generate a first clock signal for a switching operation of the power source unit in a case where the operation mode of the electronic apparatus is the high-load operation mode; and
causing the clock unit to generate a second clock signal different from the first clock signal in a case where the operation mode of the electronic apparatus is the high-load operation mode.

14. The method according to claim 13, wherein a frequency of the first clock signal is higher than a frequency of the second clock signal.

15. A non-transitory storage medium that stores a program causing a computer to execute a method, the method comprising:
determining whether a power source unit is caused to operate in a first operation mode or a second operation mode;
causing a switching unit to perform switching so that a first inductor is used in the power source unit in a case where the power source unit operates in the first operation mode and a second inductor different from the first inductor is used in the power source unit in a case where the power source unit operates in the second operation mode;
causing an image capture unit to capture an image; and
changing a clock signal used by the image capture unit to a clock signal of a predetermined frequency in a case where the power source unit operates in the first operation mode,
wherein the predetermined frequency is a frequency that does not overlap a peak frequency of a frequency band of switching noise that occurs in the first operation mode or a frequency that does not overlap a harmonic of the peak frequency.

* * * * *